United States Patent
Zhang et al.

(10) Patent No.: US 11,754,973 B2
(45) Date of Patent: Sep. 12, 2023

(54) FAST IMAGING METHOD SUITABLE FOR PASSIVE IMAGING AND ACTIVE IMAGING

(71) Applicant: Suzhou Weimo Electronic Information Technology Co., LTD., Kunshan (CN)

(72) Inventors: Jilong Zhang, Kunshan (CN); Jikang Zhang, Kunshan (CN); Yiheng Zhang, Kunshan (CN); Yuhua Song, Kunshan (CN); Xiaolin Yu, Kunshan (CN)

(*) Notice: Subject to any disclaimer, the term of this patent is extended or adjusted under 35 U.S.C. 154(b) by 0 days.

(21) Appl. No.: 17/851,143

(22) Filed: Jun. 28, 2022

(65) Prior Publication Data
US 2023/0097480 A1    Mar. 30, 2023

Related U.S. Application Data

(63) Continuation of application No. PCT/CN2022/084251, filed on Mar. 31, 2022.

(51) Int. Cl.
*G03H 1/08*        (2006.01)
*G03H 1/16*        (2006.01)
(Continued)

(52) U.S. Cl.
CPC ........... *G03H 1/0866* (2013.01); *G01S 13/90* (2013.01); *G01S 15/8972* (2013.01); *G03H 1/16* (2013.01); *G03H 2001/0883* (2013.01)

(58) Field of Classification Search
CPC ...... G02B 2027/0174; G02B 2027/014; G01S 13/89; G01S 13/887; G01S 13/90;
(Continued)

(56) References Cited

U.S. PATENT DOCUMENTS 8,227,735 B1*  7/2012  Marron ................ G03H 1/0443
                                                           250/221
10,983,340 B2*  4/2021  Popovich ............. G02B 6/0026
(Continued)

FOREIGN PATENT DOCUMENTS

CN        112612024 A       12/2020
CN        113848546 A       9/2021

*Primary Examiner* — Olumide Ajibade Akonai
(74) *Attorney, Agent, or Firm* — Richard G. Topolewski

(57) ABSTRACT

The present invention relates to the technical fields of optical imaging, microwave imaging, radar detection, sonar, ultrasonic imaging, and target detection, imaging identification and wireless communication based on media such as sound, light and electricity, and in particular, to a fast imaging method suitable for passive imaging and active imaging and application of the fast imaging method in the above fields. According to the method provided by the present invention, image field distribution corresponding to a target is achieved based on a lens imaging principle, in combination with an electromagnetic field theory, according to a target signal received by an antenna array, through the amplitude and phase weighting of a unit signal and by using an efficient parallel algorithm. The method provided by the present invention has the advantages of capability of being compatible with passive imaging and holographic imaging, good imaging effect, small operation amount, low hardware cost, high imaging speed and suitability for long-distance imaging, and can be widely applied in the fields of optical imaging, microwave imaging, radar detection, sonar, ultrasonic imaging, and target detection, imaging identification and wireless communication based on media such as sound, light and electricity.

11 Claims, 3 Drawing Sheets

(51) Int. Cl.
*G01S 13/90* (2006.01)
*G01S 15/89* (2006.01)

(58) Field of Classification Search
CPC .... G01S 13/003; G01S 13/04; G01S 13/9064;
G01S 7/356; G01S 7/352; G01S 15/8972;
G01S 15/8997; G02F 1/13342; G03H
1/0443; G03H 1/0866; G03H 1/08
See application file for complete search history.

(56) References Cited

U.S. PATENT DOCUMENTS

| | | |
|---|---|---|
| 2012/0218379 A1* | 8/2012 | Ozcan ................ G03H 1/0443 |
| | | 348/40 |
| 2017/0192094 A1 | 7/2017 | Marron et al. |
| 2017/0328998 A1* | 11/2017 | Murakowski ........... G01S 13/36 |
| 2018/0267299 A1* | 9/2018 | Sitter, Jr. ................ G01S 17/66 |
| 2021/0190663 A1 | 6/2021 | Vanmeerbeeck et al. |
| 2021/0295152 A1 | 9/2021 | Bouman et al. |

\* cited by examiner

FAST IMAGING METHOD SUITABLE FOR PASSIVE IMAGING AND ACTIVE IMAGING

TECHNICAL FIELD

The present invention relates to the technical fields of optical imaging, microwave imaging, radar detection, sonar, ultrasonic imaging, and target detection, imaging identification and wireless communication based on media such as sound, light and electricity, and in particular, to a fast imaging method suitable for passive imaging and active imaging and application of the fast imaging method in the above fields.

BACKGROUND

The digital holographic imaging technology evolved from the laser holographic imaging technology has high imaging resolution rate and is one of the preferred technologies of millimeter wave active imaging at present; moreover, related products at home and abroad have been popularized and applied in different fields.

However, the traditional digital holographic imaging technology still has many defects and disadvantages, mainly including:

1) The traditional digital holographic imaging technology has large operation amount, high cost and low imaging speed.

The existing digital holographic imaging technology requires two sequential operations of fast Fourier transform (FFT) and inverse fast Fourier transform (IFFT) ("FFT-phase compensation-IFFT" operation) during imaging, which has extremely large operation amount and high requirements on the configuration of the hardware environment and the calculation resource, resulting in high hardware prices and operation costs; in addition, the need for two sequential operations of FFT and IFFT leads to a slower imaging speed.

2) The traditional digital holographic imaging technology only can be applied to near field imaging and cannot be applied to long-distance image.

In the existing digital holographic imaging technology, when the target is far away, the phase compensation may be ignored, which is equivalent to "FFT-IFFT" operation, resulting in imaging distortion, even imaging failure.

In addition, the inventor has developed related fast imaging technologies, but different methods are required for passive imaging and active imaging, which are less compatible with each other, thus adding difficulties to practical use; furthermore, some methods are not suitable for short-distance imaging. Since the phase compensation method depends on an object distance parameter U, when the imaging distance is short, the method cannot achieve a satisfied imaging effect due to low resolution rate; therefore, it is of a great application value to develop an imaging method with high compatibility and excellent imaging effect.

SUMMARY

To overcome the above defects and disadvantages in the traditional digital holographic active imaging technology, the present invention provides a set of solutions.

As shown in FIG. 1, a coordinate system of an imaging system is established, where P is a target, Q is an image of the target, an antenna array is located on a plane of z=0, and X denotes a transceiving antenna unit.

When a signal is propagated through one-way $R_1$ and $R_2$, the introduced propagation phase shift is:

$$\begin{cases} \phi_1 \approx kU + \dfrac{k(x-\zeta)^2 + k(y-\xi)^2}{2U} \\ \phi_2 \approx kV + \dfrac{k(\delta-x)^2 + k(\sigma-y)^2}{2V} \end{cases};$$

where a part useful for imaging focusing is:

$$\begin{cases} \phi_1 = \dfrac{k(x-\zeta)^2 + k(y-\xi)^2}{2U} \\ \phi_2 = \dfrac{k(\delta-x)^2 + k(\sigma-y)^2}{2V} \end{cases};$$

where $\phi_1$ is a propagation phase shift from a scattering source P to an array unit, $\phi_2$ is a propagation phase shift from the array unit to an image point Q, $$k = \frac{2\pi}{\lambda}$$

is a wave number, $\lambda$ is a wave length, U is an object distance, that is, a distance from a target to an array plane, and V is an image distance, that is, a distance from an imaging plane to an array plane; $(\zeta,\xi)$ is the coordinates of the target, (x,y) is the coordinates of the array unit, and $(\delta,\sigma)$ is the coordinates of the image point.

The antenna array is equivalent to a lens with a focal distance F, then the effective phase shift of a lens unit is:

$$\phi_L = -\frac{k(x^2 + y^2)}{2F};$$

where $\phi_L$ is a lens phase shift of the array unit, and F is the focal distance.

During passive imaging, the antenna unit does not emit a detection signal and is only configured to receive a scattering signal of the target. After the antenna receives the scattering signal of the target, secondary scattering is performed in the form of spherical wave, then the field intensity at the image plane after the phase shift passing through different transmission path $R_1$ and $R_2$ and the lens unit:

$$\vec{E}_q(\delta,\sigma) = \vec{E}_p(\zeta,\xi) \iint e^{-j(\phi_1 + \phi_L + \phi_2)} dx dy.$$

where $\vec{E}_q(\delta,\sigma)$ is image field distribution, and $\vec{E}_p(\zeta,\xi)$ is the scattering signal of the target.

In a holographic imaging system, the signal is emitted by the antenna unit and is received by the antenna unit after being reflected by the target, the signal has undergone a two-way transmission with a path $R_1$, and the corresponding phase delay is $2\phi_1$. During imaging processing, it is necessary to perform two-way processing on the lens unit phase shift and the $R_2$ propagation phase shift: the transceiving antenna unit sequentially emits a detection signal, after the signal reflected by the target P arrives at the transceiving antenna unit, secondary scattering is performed in the form of a spherical wave, then the field intensity at the plane after different transmission paths $R_1$ and $R_2$ and two-way phase shift:

$$\vec{E}_q(\delta,\sigma) = \vec{E}_p(\zeta,\xi) \iint e^{-2j(\phi_1 + \phi_L + \phi_2)} dx dy.$$

Through comparison between the imaging formulas under the above two situations and by introducing an object selectivity parameter the above two formulas may be unified as follows:

$$\vec{E}_q(\delta,\sigma) = \vec{E}_p(\zeta,\xi) \iint e^{-j\eta(\phi_1+\phi_L+\phi_2)} dxdy;$$

where when $\eta=1$ is selected, it is suitable for passive imaging, semi-active imaging, conventional active imaging, phased array beam scanning imaging and phase array digital beam synthetic imaging systems, that is, the systems in which the array unit receives the signal at the same time; and $\eta=2$ is selected, it is suitable for active holographic imaging, synthetic aperture imaging and inverse synthetic aperture imaging systems, that is, the systems in which the array unit sequentially emits and receives signals.

For a discrete array system, the above integral symbol is replaced with a summation symbol:

$$\vec{E}_q(\delta,\sigma) = \vec{E}_p(\zeta,\xi) \Sigma\Sigma e^{-j\eta(\phi_1+\phi_L+\phi_2)};$$

after the expressions $\phi_1$, $\phi_L$ and $\phi_2$ are substituted, the formula is simplified and collated to obtain:

$$\vec{E}_q(\delta,\sigma) = \vec{E}_p(\zeta,\xi) e^{-j\Psi_0} \cdot \frac{e^{jM\omega}\delta - 1}{e^{j\omega}\delta - 1} \cdot \frac{e^{jN\omega}\sigma - 1}{e^{j\omega}\sigma - 1};$$

where $\Psi_0 = \frac{\eta k(\zeta^2+\xi^2)}{2U} + \frac{\eta k(\delta^2+\sigma^2)}{2V} - \frac{\eta k(\delta-\delta_0)x_0}{V} - \frac{\eta k(\sigma-\sigma_0)y_0}{V}$, $\omega_\delta = \frac{\eta k(\delta-\delta_0)\Delta_x}{V}$, $\omega_\sigma = \frac{\eta k(\sigma-\sigma_0)\Delta_y}{V}$, $\delta_0 = -\frac{\zeta V}{U}$, $\sigma_0 = -\frac{\xi V}{U}$ and M are the number of the array units in the x direction, N is the number of the array units in the y direction, $\Delta_x$ and $\Delta_y$ are the distances among the array units in th x direction and the y direction respectively, and $(x_0, y_0)$ is the coordinates of the array start unit.

The coefficient item $|e^{-j\Psi_0}|=1$ does not affect the image field amplitude distribution, which may not be ignored. Definition:

$$\mathcal{H}(\delta,\sigma) = \frac{e^{jM\omega}\delta - 1}{e^{j\omega}\delta - 1} \cdot \frac{e^{jN\omega}\sigma - 1}{e^{j\omega}\sigma - 1};$$

according to the zero point situation of the formula, the radius of the center image spot of an ideal point source target may be evaluated as follows:

$$\begin{cases} r_\delta = \frac{\lambda V}{\eta M \Delta_x} \\ r_\sigma = \frac{\lambda V}{\eta N \Delta_y} \end{cases};$$

the diffusion angle of the image field center image spot relative to the center of the antenna array is:

$$\begin{cases} \theta_\delta = 2\tan^{-1}\left(\frac{\lambda}{\eta M \Delta_x}\right) \\ \theta_\sigma = 2\tan^{-1}\left(\frac{\lambda}{\eta N \Delta_y}\right) \end{cases};$$

and $\eta=1$ during passive imaging, $\eta=2$ during active holographic imaging, and it can be seen from the above formula that the resolution rate of the active holographic imaging is doubled.

For the actual discrete array system, assuming that the target signal received by the transceiving antenna unit is E, during imaging, it is necessary to process the signal received by the array as follows:

$$\vec{E}_q(\delta,\sigma) = \Sigma_{m=1}^M \Sigma_{n=1}^N \vec{E}_{mn} A_{mn} e^{-j\eta(\phi_L+\phi_2)};$$

where $\vec{E}_{mn}$ is the target signal received by the array unit, and $A_{mn}$ is an amplitude weighting coefficient of the array unit. The above formula is expanded and collated to obtain:

$$\vec{E}_q = e^{-j\psi_0} \sum_{m=1}^M \sum_{n=1}^N \vec{E}_{mn} A_{mn} e^{j\phi_{F_{mn}}} e^{-j\psi_1} e^{\frac{j\eta(k\delta x_m + k\sigma y_n)}{V}};$$

where $\psi_0 = \frac{\eta k(\delta^2+\sigma^2)}{2V}$, $\phi_{F_{mn}} = \frac{\eta k(x_m^2+y_n^2)}{2U}$ and $\psi_1 = \frac{\eta k(x_m^2+y_n^2)}{2}\left(\frac{1}{U}+\frac{1}{V}-\frac{1}{F}\right)$.

When the imaging condition is met:

$\frac{1}{U}+\frac{1}{V}-\frac{1}{F}=0$, $\psi_1 = 0$.

$$\vec{E}_q = e^{-j\psi_0} \sum_{m=1}^M \sum_{n=1}^N \vec{E}_{mn} A_{mn} e^{j\phi_{F_{mn}}} e^{\frac{j\eta(k\delta x_m + k\sigma y_n)}{V}};$$

Assuming that $x_m = x_0 + m\Delta_x$ and $y_n = y_0 + n\Delta_y$, m and n are the serial number of the array units in the x direction and the y direction respectively, and $(x_0, y_0)$ is the coordinates of the array start unit. The above is substituted into the above formula and is collated to obtain:

$$\vec{E}_q = e^{-j\psi_2} \sum_{m=0}^{M-1} \sum_{n=0}^{N-1} \vec{E}_{mn} A_{mn} e^{j\phi_{F_{mn}}} e^{jm\omega_\delta} e^{jn\omega_\sigma};$$

where $\psi_2 = \frac{\eta k(\delta^2+\sigma^2)}{2V} - \frac{\eta k\delta x_0}{V} - \frac{\eta k\sigma y_0}{V}$, $\omega_\delta = \frac{\eta k\delta\Delta_x}{V}$ and $\omega_\sigma = \frac{\eta k\sigma\Delta_y}{V}$.

The coefficient on the right of the above formula meets $|e^{j\psi_2}|=1$, which reflects the spatial fluctuation characteristic of the image field and has basically no influence on imaging, so it can be ignored. The summation operation may perform fast solution by two-dimensional fast inverse Fourier transform, then the calculation formula of the image field is:

$$\vec{E}_q(\omega_\delta,\omega_\sigma)=\text{IFFT}(\vec{E}_{mn}A_{mn}e^{j\phi_{Fmn}});$$

where IFFT denotes two-dimensional fast inverse Fourier transform. The value ranges of $\omega_\delta$ and $\omega_\sigma$ corresponding to the calculation result of IFFT are: $\omega_\delta \in [0,2\pi]$ and $\omega_\sigma \in 0, E [0,2\pi]$. After the fftshift operation, the value ranges of $\omega_\delta$ and $\omega_\sigma$ are transformed into: $\omega_\delta \in [-\pi,\pi]$ and $\omega_\sigma \in [-\pi,\pi]$. The image at this point is the one that matches the actual distribution and has a good linear mapping relationship with the source field.

$$\vec{E}_{q\_image}(\omega_\delta,\omega_\sigma)=\text{fftshift}[\vec{E}_q(\omega_\delta,\omega_\sigma)];$$

in combination with the array antenna theory, there are $\omega_\delta=\eta k\Delta_x \sin\theta_\delta$ and $\omega_\sigma=\eta k\Delta_y \sin\theta_\sigma$.

Since the repeated cycle of discrete FFT transform is $2\pi$, if no image aliasing is required, $$|\omega| \leq \pi;$$

so that $$\Delta \leq \frac{\lambda}{2\eta|\sin\theta|};$$

the effective range of the scanning angle $\theta$ is generally $[-\pi/2, \pi/2]$, and the condition which ensures the above formula is always workable is:

$$\Delta \leq \frac{\lambda}{2\eta};$$

the condition of no aliasing in the semi-airspace image is:

$$\Delta_x \leq \frac{\lambda}{2\eta} \text{ and } \Delta_y \leq \frac{\lambda}{2\eta}.$$

The coordinates of the scanning angle of the image point are corrected by the array antenna theory:

$$\begin{cases} \theta_\delta = \sin^{-1}\left(\frac{\omega_\delta}{\eta k\Delta_x}\right) \\ \theta_\sigma = \sin^{-1}\left(\frac{\omega_\sigma}{\eta k\Delta_y}\right) \end{cases};$$

Our research shows that the phase-matching formula $$\phi_{F_{mn}} = \frac{\eta k(x_m^2 + y_n^2)}{2U}$$

may be further improved, and the imaging performance under the condition of large angle may be improved by replacing the object distance parameter with the target slant distance:

$$\phi_{F_{mn}} = \frac{\eta k(x_m^2 + y_n^2)}{2R}.$$

Based on the above knowledge, the present invention provides a fast imaging method suitable for passive imaging and active imaging. According to the method, image field distribution corresponding to a target is achieved based on a lens imaging principle, in combination with an electromagnetic field theory, according to a target signal received by an antenna array, through the amplitude and phase weighting of a unit signal and by using an efficient parallel algorithm, and the specific algorithm is as follows:

$$\vec{E}_q(\delta,\sigma) = \sum_{m=1}^{M}\sum_{n=1}^{N}(\vec{E}_{mn}A_{mn}e^{j\phi_{Fmn}}e^{j\phi_{Smn}})e^{\frac{j\eta(k\delta x_m + k\sigma y_n)}{V}};$$

where j is an imaginary unit, e is an Euler's constant, $\vec{E}_q(\delta, \sigma)$ is image field distribution, $\vec{E}_{mn}$ is a target signal received by an array unit, $A_{mn}$ is an array unit amplitude weighting coefficient, $\phi_{F_{mn}}$ is a focusing phase weighting coefficient, $\phi_{S_{mn}}$ is a scanning phase weighting coefficient, M is the number of array units in an x direction, N is the number of array units in a y direction, $(x_m, y_n)$ is the coordinates of the array unit, $(\delta, \sigma)$ is the coordinates of an image point, V is an image distance, that is, a distance from an imaging plane to an array plane, $\eta$ is an object selectivity parameter, different values are selected according to the characteristic of an imaging system, m and n are the serial number of the array units in the x direction and the y direction respectively, $$k = \frac{2\pi}{\lambda}$$

is a wave number, $\lambda$ is a wave length and the symbol $\Sigma$ denotes summation operation.

Further, the method is suitable for different imaging systems by selecting different parameter $\eta$ values, specifically:

when $\eta=1$ is selected, the method is suitable for passive imaging, semi-active imaging, conventional active imaging, phased array beam scanning imaging and phase array digital beam synthetic imaging systems; and when $\eta=2$ is selected, the method is suitable for active holographic imaging, synthetic aperture imaging and inverse synthetic aperture imaging systems.

Specifically, the fast imaging method suitable for passive imaging and active imaging provided by the present invention includes the following steps:

Step 1: performing amplitude weighting on an array unit signal to reduce a minor lobe level;

Step 2: performing scanning phase weighting on the array unit signals to adjust a center view direction of an imaging system;

Step 3: performing focusing phase weighting on the array unit signals to realize imaging focusing;

Step 4: performing fast imaging processing on the array unit signals by an efficient parallel algorithm; and Step 5: calculating the coordinates of an image field and performing coordinate inversion on the image field to obtain the position of a real target.

Further, according to the method provided by the present invention, in the step 1, the amplitude weighting method includes but is not limited to uniform distribution, cosine weighting, Hamming window, Taylor distribution, Chebyshev distribution and mixed weighting methods.

Further, according to the method provided by the present invention, in the step 2, the scanning phase weighting is adjusted into the center view direction of the imaging system, and the phase calculation formula of the scanning phase weighting is:

$$\phi_S(m,n)=\eta m\Delta_{\phi_x}+\Delta n\Delta_{\phi_y};$$

where $\Delta_{\phi_{xx}}$ and $A_{\phi_y}$ are the phase differences between the adjacent array units in the x direction and the y direction respectively, and the calculation formulas are respectively as follows:

$$\Delta_{\phi_x}=k\Delta_x \sin\theta_\zeta,$$

$$\Delta_{\phi_y}=k\Delta_y \sin\theta_\xi;$$

where $\Delta_x$ and $\Delta_y$ are the distances between the array units in the x direction and the y direction respectively, the symbol sin denotes a sine function, $\theta_\zeta$ and $\theta_\xi$ are the coordinates of scanning angles in the x direction and the y direction when the center view angle direction points to the source coordinates $(\zeta,\xi)$, and the calculation formulas are respectively as follows:

$$\theta_\zeta = -\tan^{-1}\left(\frac{\zeta}{U}\right),$$

$$\theta_\xi = -\tan^{-1}\left(\frac{\xi}{U}\right);$$

where U is an object distance, that is, a distance from a plane where the target is located to an array plane, and the symbol $\tan^{-1}$ denotes an arctangent function.

Further, according to the method provided by the present invention, the step 3 includes: performing focusing phase weighting on the array unit signal by a focusing phase weighting method to realize imaging focusing, where the focusing phase calculation formula of automatic focusing phase weighting is:

$$\phi_F = \frac{\eta k(x_m^2 + y_n^2)}{2R};$$

where R is a target slant distance, that is, a distance from the target to the array center;

the focusing phase calculation formula of variable-focus or fixed-focus phase weighting is:

$$\phi_F = \frac{\eta k(V - F)(x_m^2 + y_n^2)}{2VF};$$

where F is a focal distance, V is an image distance, that is, a distance from an imaging plane to a plane where a receiving plane is located, and F<U and F<V.

Further, according to the method provided by the present invention, the step 4 includes: performing fast imaging processing on the amplitude-phase-weighted array unit signals by the efficient parallel algorithm; and the efficient parallel algorithm includes but is not limited to two-dimensional or three-dimensional FFT, IFFT, non-uniform FFT, sparse FFT, and the calculation formula is:

$$\vec{E}_q(\omega_\delta,\omega_\sigma)=\mathcal{F}\vec{E}\cdot A\cdot e^{j\phi_F}\cdot e^{j\phi_S});$$

where the symbol $\mathcal{F}$ denotes an efficient parallel algorithm function, $\vec{E}$ is a target signal received by the array unit, A is an array unit amplitude weighting coefficient, $\phi_F$ is a focusing phase weighting coefficient, and $\phi_S$ is a scanning phase weighting coefficient;

the value ranges of $\omega_\delta$ and $\omega_\sigma$ corresponding to the image field calculation result are: $\omega_\delta\in[0,2\pi]$ and $\omega_\sigma\in[0,2\pi]$, the value ranges of $\omega_\delta$ and $\omega_\sigma$ after the fftshift operation are transformed into: $\omega_\delta\in[-\pi,\pi]$ and $\omega_\sigma\in[-\pi,\pi]$, and at this time, the image is an image according with the actual distribution:

$$\vec{E}_q(\omega_\delta,\omega_\sigma)=\mathit{fftshift}[\vec{E}_q(\omega_\delta,\omega_\sigma)].$$

Further, according to the method provided by the present invention, the step 5 includes: performing coordinate calculation on the image field obtained by the efficient parallel algorithm and performing coordinate inversion on the image field to obtain the distribution situation of a real target, where for the IFFT type efficient parallel algorithm, the formula of calculating the coordinates of the scanning angle of the image field is:

$$\theta_\delta = \sin^{-1}\left(\frac{\omega_\delta}{\eta k\Delta_x}\right),$$

$$\theta_\sigma = \sin^{-1}\left(\frac{\omega_\sigma}{\eta k\Delta_y}\right);$$

where the symbol $\sin^{-1}$ denotes an arcsine function;

for the FFT type efficient parallel algorithm, the formula of calculating the coordinates of the scanning angle of the image field is:

$$\theta_\delta = -\sin^{-1}\left(\frac{\omega_\delta}{\eta k\Delta_x}\right),$$

$$\theta_\sigma = -\sin^{-1}\left(\frac{\omega_\sigma}{\eta k\Delta_y}\right);$$

the rectangular coordinate calculation formula of the image is:

$$\delta=V\tan\theta_\delta,$$

$$\sigma=V\tan\theta_\sigma;$$

where the symbol tan denotes a tangent function;

the coordinate inversion calculation formula of the real target is:

$$\zeta = -\frac{U\delta}{V},$$

$$\xi = -\frac{U\sigma}{V}.$$

Further, in the method provided by the present invention, distances $$\Delta_x \leq \frac{\lambda}{2\eta} \text{ and } \Delta_y \leq \frac{\lambda}{2\eta}$$

among units of a transceiving antenna are set, so that the imaging aliasing phenomenon is avoided.

Meanwhile, the present invention further relates to application of the above method in the fields of optical imaging, microwave imaging, radar detection, sonar, ultrasonic imaging, and target detection, imaging identification and wireless communication based on media such as sound, light and electricity.

In addition, the present invention further provides a fast imaging method suitable for passive imaging and active imaging. The fast imaging method is applied to long-distance imaging and includes:

selecting U=∞, then $\phi_F=0$, where the simplified formula suitable for long-distance imaging is:

$$\vec{E}_q(\omega_\delta,\omega_\sigma) = \mathcal{F}(A\vec{E}e^{j\phi_S});$$

calculating the image field by the efficient parallel algorithm, and obtaining the target distribution situation in a wide view range through one operation.

In conclusion, the fast imaging method suitable for passive imaging and active imaging provided by the present invention has the following advantages:

1) A unified imaging method compatible with passive imaging and active imaging is established.

The unified method is established and is suitable for different imaging systems by modifying some parameters, thereby providing great convenience for the actual use.

2) The imaging effect is further improved.

In the present invention, in the phase compensation method, the object distance parameter U is replaced with the target slant distance R. compared with the object distance parameter U, the parameter R is easier to acquire, and the imaging effect is more excellent.

3) Small operation amount, low hardware cost and high imaging speed are achieved.

Compared with the traditional holographic active imaging algorithm, the present invention adopts a "phase compensation-IFFT" algorithm architecture, so that the FFT operation link with high requirement on the hardware resource and low operation speed are eliminated, the operation amount is reduced and the operation speed is increased.

4) The method is suitable for long-distance imaging.

In the present invention, during long-distance imaging, the phase compensation may also be ignored and it is equivalent to performing IFFT operation, thereby realizing the imaging of the long-distance target.

In addition, the method provided by the present invention has a good application prospect and can be widely applied in the technical fields of target detection and wireless communication taking sound, light and electricity as media. When the detection medium is electromagnetic wave, the technology is suitable for microwave imaging, radar detection, wireless communication, synthetic aperture radar and inverse synthetic aperture radar; when the detection media are sonic wave and ultrasonic wave, the technology is suitable for sonar, ultrasonic imaging and synthetic aperture sonar; and when the detection medium is light, the technology is suitable for optical imaging and synthetic aperture optical imaging.

BRIEF DESCRIPTION OF THE DRAWINGS

For clearer description of the technical solutions of the embodiments of the present invention, the accompanying drawings required to describe the embodiments are briefly described hereinafter. Obviously, the accompanying drawings to be described below are merely some embodiments of the present invention, and a person of ordinary skill in the art may obtain other drawings according to these drawings without paying any creative effort.

DETAILED DESCRIPTION OF EMBODIMENTS

To make the objectives, technical solutions and advantages of the present invention clearer, the following clearly and completely describes the technical solutions of the present invention with reference to the specific embodiments and the corresponding accompanying drawings. Obviously, the described embodiments are only some rather than all of the embodiments of the present invention. The present invention can be implemented or applied through other different specific implementation manners. Various modifications or changes can be made to various details in the specification based on different viewpoints and applications without departing from the spirit of the present invention.

Meanwhile, it should be understood that the protection scope of the present invention is not limited to the following specific embodiments; and it should also be understood that the terms used in the embodiments of the present invention are used for describing specific embodiments, rather than limiting the protection scope of the present invention.

Figure 1:
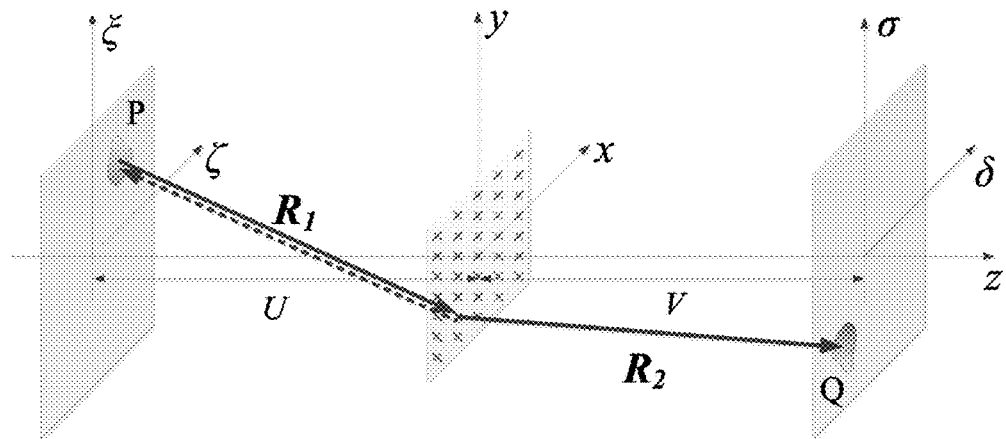
FIG. 1 is a schematic diagram of an imaging system coordinate system of an imaging method according to the present invention.
Figure 2:
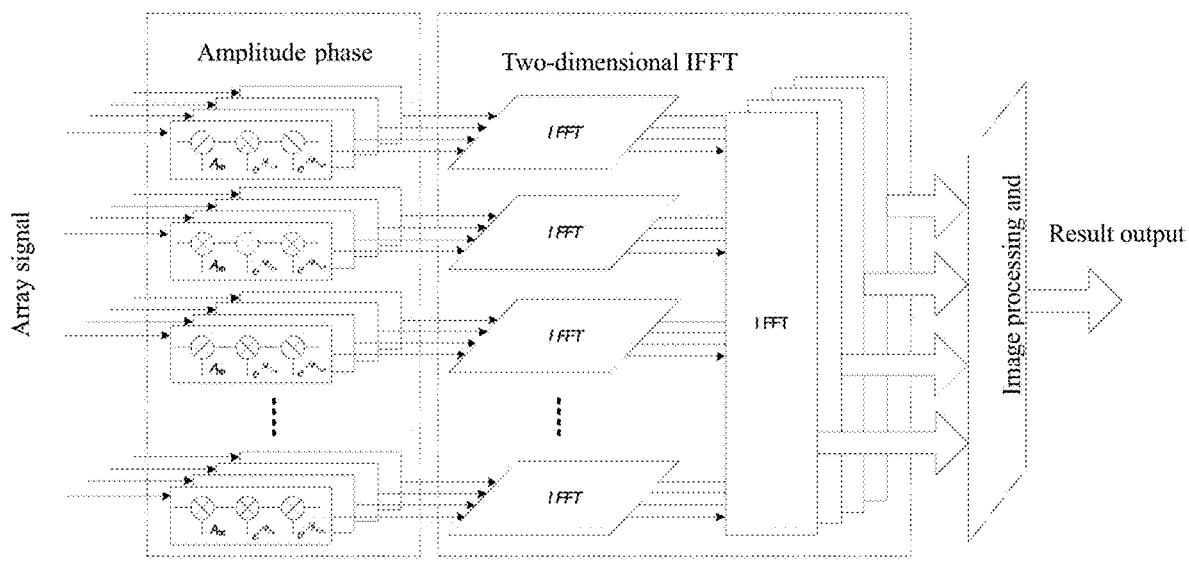
FIG. 2 is an algorithm block diagram of an imaging method according to the present invention.

Embodiment 1: a fast imaging method suitable for passive imaging and active imaging (referring to FIG. 1 to FIG. 2). According to the method, image field distribution corresponding to a target is achieved based on a lens imaging principle, in combination with an electromagnetic field theory, according to a target signal received by an antenna array, through the amplitude and phase weighting of a unit signal and by using an efficient parallel algorithm, and the specific algorithm is as follows:

$$\vec{E}_q(\delta,\sigma) = \sum_{m=1}^{M}\sum_{n=1}^{N}\left(\vec{E}_{mn}A_{mn}e^{j\phi_{F_{mn}}}e^{j\phi_{S_{mn}}}\right)e^{\frac{j\eta(k\delta x_m+k\sigma y_n)}{V}};$$

where j is an imaginary unit, e is an Euler's constant, $\vec{E}_q(\delta,\sigma)$ is image field distribution, $\vec{E}_{mn}$ is a target signal received by an array unit, $A_{mn}$ is an array unit amplitude weighting coefficient, $\phi_{F_{mn}}$ is a focusing phase weighting coefficient, $\phi_{S_{mn}}$ is a scanning phase weighting coefficient, M is the number of array units in x direction, N is the number of array units in a y direction, $(x_m, y_n)$ is the coordinates of the array unit, $(\delta, \sigma)$ is the coordinates of an image point, V is an image distance, that is, a distance from an imaging plane to an array plane, η is an object selectivity parameter, different values are selected according to the characteristic of an imaging system: when η=1, it is suitable for passive imaging, semi-active imaging, conventional active imaging, phase array beam scanning imaging and phase array digital beam synthetic imaging systems; when $\eta=2$, it is suitable for active holographic imaging, synthetic aperture imaging and inverse synthetic aperture imaging systems; m and n are the serial number of the array units in the x direction and the y direction respectively, $$k = \frac{2\pi}{\lambda}$$

is a wave number, $\lambda$ is a wave length, and the symbol $\Sigma$ denotes summation operation.

Specifically, the fast imaging method provided by the present invention includes the following steps:

Step 1: performing amplitude weighting on array unit signal to reduce a minor lobe level, where the amplitude weighting method includes uniform distribution, cosine weighting, Hamming window, Taylor distribution, Chebyshev distribution and mixed weighting methods.

Step 2: performing scanning phase weighting on the array unit signals to adjust a center view direction of an imaging system, where the phase calculation formula of the scanning phase weighting is:

$$\phi_S(m,n) = \eta m \Delta_{\phi_x} + \eta n \Delta_{\phi_y};$$

where $\Delta_{\phi_x}$ and $\Delta_{\phi_y}$ are the phase differences between the adjacent array units in the x direction and the y direction respectively, and the calculation formulas are respectively as follows:

$$\Delta_{\phi_x} = k\Delta_x \sin \nu_\zeta,$$

$$\Delta_{\phi_y} = k\Delta_y \sin \theta_\xi,$$

where $\Delta_x$ and $\Delta_y$ are the distances between the array units in the x direction and the y direction respectively, the symbol sin denotes a sine function, $\theta_\zeta$ and $\theta_\xi$ are the coordinates of scanning angles in the x direction and the y direction when the center view angle direction points to the source coordinates $(\zeta,\xi)$, and the calculation formulas are respectively as follows:

$$\theta_\zeta = -\tan^{-1}\left(\frac{\zeta}{U}\right),$$

$$\theta_\xi = -\tan^{-1}\left(\frac{\xi}{U}\right);$$

where U is an object distance, that is, a distance from a plane where the target is located to an array plane, and the symbol $\tan^{-1}$ denotes an arctangent function.

Step 3: performing focusing phase weighting on the array unit to realize imaging focusing, specifically including: performing focusing phase weighting on the array unit signal by a focusing phase weighting method to realize imaging focusing, where the focusing phase calculation formula of automatic focusing phase weighting is:

$$\phi_F = \frac{\eta k(x_m^2 + y_n^2)}{2R};$$

where R is a target slant distance, that is, a distance from the target to the array center;

the focusing phase calculation formula of variable-focus or fixed-focus phase weighting is:

$$\phi_F = \frac{\eta k(V-F)(x_m^2 + y_n^2)}{2VF};$$

where F is a focal distance, V is an image distance, that is, a distance from an imaging plane to a plane where a receiving plane is located, and F<U and F<V.

Step 4: performing fast imaging processing on the array unit signals by an efficient parallel algorithm, specifically including: fast imaging processing is performed on the amplitude-phase-weighted array unit signals by the efficient parallel algorithm, where the efficient parallel algorithm includes two-dimensional or three-dimensional FFT, IFFT, non-uniform FFT, sparse FFT, and the calculation formula is:

$$\vec{E}_q(\omega_\delta,\omega_\sigma) = \mathcal{F}(\vec{E} \cdot A \cdot e^{j\phi_F} \cdot e^{j\phi_S}).$$

where the symbol $\mathcal{F}$ denotes an efficient parallel algorithm function, $\vec{E}$ is a target signal received by the array unit, A is an array unit amplitude weighting coefficient, $\phi_F$ is a focusing phase weighting coefficient, and $\phi_S$ is a scanning phase weighting coefficient;

the value ranges of $\omega_S$ and $\omega_\sigma$ corresponding to the image field calculation result are: $\omega_S \in [0,2\pi]$ and $\omega_\sigma \in [0,2\pi]$, the value ranges of $\omega_\delta$ and $\omega_\sigma$ after the fftshift operation are transformed into: $\omega_\delta \in [-\pi, \pi]$ and $\omega_\sigma \in [-\pi, \pi]$, and at this time, the image is an image according with the actual distribution:

$$\vec{E}_q(\omega_\delta,\omega_\sigma) = \mathit{fftshift}[\vec{E}_q(\omega_\delta,\omega_\sigma)].$$

Step 5: calculating the coordinates of an image field and performing coordinate inversion on the image field to obtain the position of a real target, specifically including: coordinate calculation is performed on the image field obtained by the efficient parallel algorithm and coordinate inversion is performed on the image field to obtain the distribution situation of a real target, where for the IFFT type efficient parallel algorithm, the formula of calculating the coordinates of the scanning angle of the image field is:

$$\theta_\delta = \sin^{-1}\left(\frac{\omega_\delta}{\eta k \Delta_x}\right),$$

$$\theta_\sigma = \sin^{-1}\left(\frac{\omega_\sigma}{\eta k \Delta_y}\right);$$

where the symbol $\sin^{-1}$ denotes an arcsine function;

for the FFT type efficient parallel algorithm, the formula of calculating the coordinates of the scanning angle of the image field is:

$$\theta_\delta = -\sin^{-1}\left(\frac{\omega_\delta}{\eta k \Delta_x}\right),$$

$$\theta_\sigma = -\sin^{-1}\left(\frac{\omega_\sigma}{\eta k \Delta_y}\right);$$

the rectangular coordinate calculation formula of the image is:

$$\delta = V \tan \theta_\delta;$$

$\sigma = V \tan \theta_o;$ where the symbol tan denotes a tangent function;
the coordinate inversion calculation formula of the real target is:

$$\zeta = -\frac{U\delta}{V},$$

$$\xi = -\frac{U\sigma}{V}.$$

In addition, in the method provided by the present invention, distances $$\Delta_x \leq \frac{\lambda}{2\eta} \text{ and } \Delta_y \leq \frac{\lambda}{2\eta}$$

among units of a transceiving antenna are set, so that the imaging aliasing phenomenon is avoided.

Figure 3:
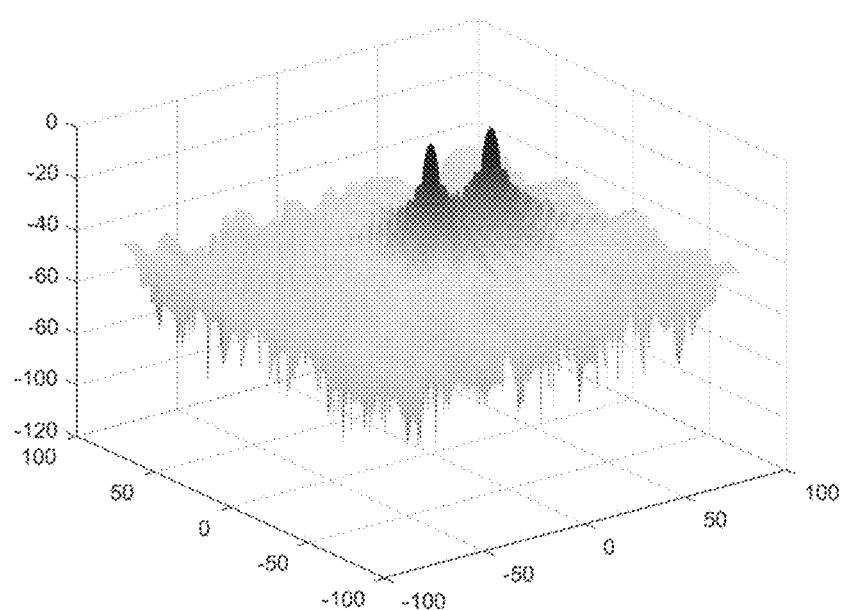
FIG. 3 is an imaging result diagram of a passive imaging case 1 performed by an imaging method according to the present invention.

Embodiment 2: the method provided by the present invention (the method in the embodiment 1) is applied to effect verification test of passive imaging Test conditions: the work frequency is 30 GHz, the distance between the antenna units is λ/2, the array scale is 32*32, one target is located in an array normal direction, the other target deviates from the normal direction by 30°, the distance from the target to the plane where the antenna array is located is 1 m, and the imaging result is shown in FIG. 3.

Figure 4:
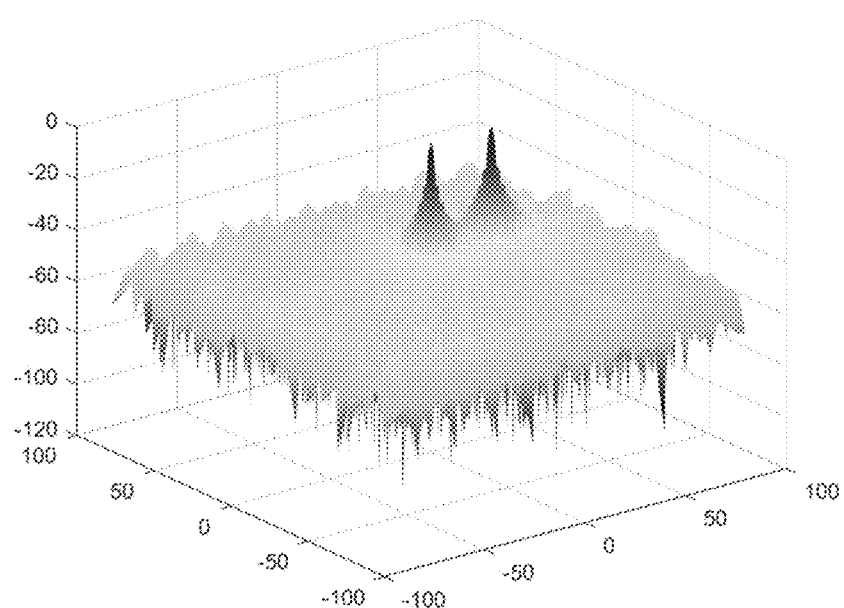
FIG. 4 is an imaging result diagram of an active holographic imaging case 2 performed by an imaging method according to the present invention.

Embodiment 3: the method provided by the present invention (the method in the embodiment 1) is applied to effect verification test of active holographic imaging Test conditions: the work frequency is 30 GHz, the distance between the antenna units is λ/4, the array scale is 66*66, one target is located in an array normal direction, the other target deviates from the normal direction by 30°, the distance from the target to the plane where the antenna array is located is 1 m, and the imaging result is shown in FIG. 4.

Figure 5:
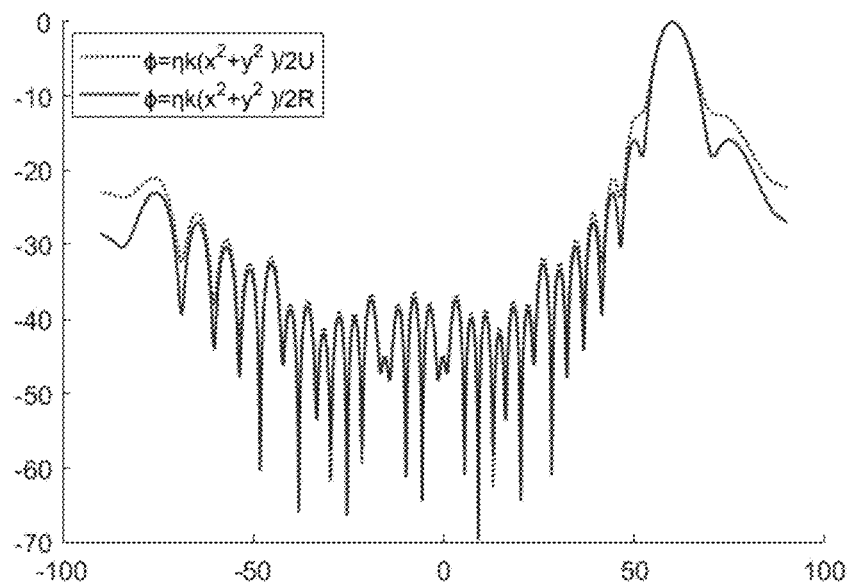
FIG. 5 is an imaging result diagram of a passive imaging case 3 performed by an imaging method according to the present invention.

Embodiment 4: the method provided by the present invention (the method in the embodiment 1) is applied to effect verification test of passive imaging Test conditions: the work frequency is 30 GHz, the distance between the antenna units is λ/2, the array scale is 32*32, the target deviates from the normal direction by 60°, the distance from the target to the plane where the antenna array is located is 1 m, the object distance parameter U is replaced with the slant distance R during phase matching, the minor lobe level is reduced by about 3.6 dB, and the imaging result is shown in FIG. 5.

Figure 6:
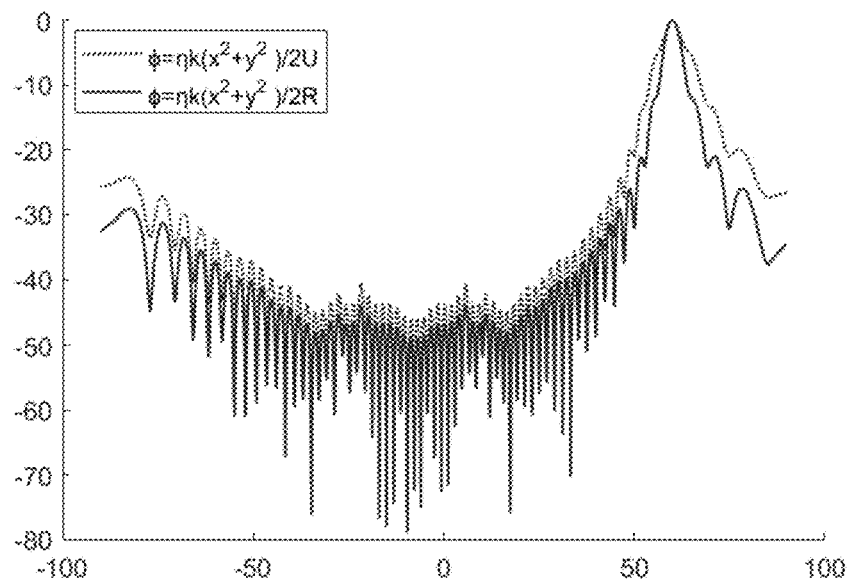
FIG. 6 is an imaging result diagram of an active holographic imaging case 4 performed by an imaging method according to the present invention.

Embodiment 5: the method provided by the present invention (the method in the embodiment 1) is applied to effect verification test of active holographic imaging Test conditions: the work frequency is 30 GHz, the distance between the antenna units is λ/4, the array scale is 66*66, the target deviates from the normal direction by 60°, the distance from the target to the plane where the antenna array is located is 1 m, the object distance parameter U is replaced with the slant distance R during phase matching, the minor lobe level is reduced by about 7 dB, and the imaging result is shown in FIG. 6.

Embodiment 6: a fast imaging method suitable for passive imaging and active imaging. The method is applied to long-distance imaging and includes: U=∞ is selected, then $\phi_F=0$, and the simplified formula suitable for long-distance imaging is:

$$\vec{E}_q(\omega_\delta, \omega_\sigma) = F(A \vec{E} e^{j\phi_S}); \text{ and}$$

the symbol F denotes an efficient parallel algorithm function, the image field is calculated by the efficient parallel algorithm, and the target distribution situation in the wide view range is obtained through one operation.

Each embodiment in the present invention is described in a progressive manner, each embodiment focuses on the difference from other embodiments, and the same and similar parts between the embodiments may refer to each other.

The above is only embodiments of the present invention, and is not intended to limit the present invention. Various changes and modifications may be made to the present invention by those skilled in the art. Any modifications, substitutions and the like made within the spirit and principle of the present invention should be included within the protection scope of the claims of the present invention.

The invention claimed is:

1. A fast imaging method suitable for passive imaging and active imaging, wherein according to the method, image field distribution corresponding to a target is achieved based on a lens imaging principle, in combination with an electromagnetic field theory, according to a target signal received by an antenna array, through the amplitude and phase weighting of a unit signal and by using an efficient parallel algorithm, and the specific algorithm is as follows:

$$\vec{E}_q(\delta, \sigma) = \sum_{m=1}^{M} \sum_{n=1}^{N} (\vec{E}_{mn} A_{mn} e^{j\phi_{F_{mn}}} e^{j\phi_{S_{mn}}}) e^{\frac{jn(k\delta x_m + k\sigma y_n)}{V}};$$

wherein j is an imaginary unit, e is an Euler's constant, $\vec{E}_q(\delta, \sigma)$ is image field distribution, $\vec{E}_{mn}$ is a target signal received by an array unit, $A_{mn}$ is an array unit amplitude weighting coefficient, $\phi_{F_{mn}}$ is a focusing phase weighting coefficient, $\phi_{S_{mn}}$ is a scanning phase weighting coefficient, M is the number of array units in an x direction, N is the number of array units in a y direction, $(x_m, y_n)$ is the coordinates of the array unit, $(\delta, \sigma)$ is the coordinates of an image point, V is an image distance, that is, a distance from an imaging plane to an array plane, η is an object selectivity parameter, different values are selected according to the characteristic of an imaging system, in and n are the serial number of the array units in the x direction and the y direction respectively, $$k = \frac{2\pi}{\lambda}$$

is a wave number, λ is a wave length and the symbol Σ denotes summation operation.

2. The method according to claim 1, wherein the method is suitable for different imaging systems by selecting different parameter η values, specifically:
   when η=1 is selected, the method is suitable for passive imaging, semi-active imaging, conventional active imaging, phased array beam scanning imaging and phase array digital beam synthetic imaging systems; and
   when η=2 is selected, the method is suitable for active holographic imaging, synthetic aperture imaging and inverse synthetic aperture imaging systems.

3. The method according to claim 2, comprising the following steps:

Step 1: performing amplitude weighting on an array unit signal to reduce a minor lobe level;

Step 2: performing scanning phase weighting on the array unit signals to adjust a center view direction of an imaging system;

Step 3: performing focusing phase weighting on the array unit signals to realize imaging focusing;

Step 4: performing fast imaging processing on the array unit signals by an efficient parallel algorithm; and Step 5: calculating the coordinates of an image field and performing coordinate inversion on the image field to obtain the position of a real target.

4. The method according to claim 3, wherein in the step 1, the amplitude weighting method comprises uniform distribution, cosine weighting, Hamming window, Taylor distribution, Chebyshev distribution and mixed weighting methods.

5. The method according to claim 3, wherein in the step 2, the scanning phase weighting is adjusted into the center view direction of the imaging system, and the phase calculation formula of the scanning phase weighting is:

$$\phi_S(m,n) = \eta m \Delta_{\phi_x} + \eta n \Delta_{\phi_y};$$

wherein $\Delta_{\phi_x}$ and $\Delta_{\phi_y}$ are the phase differences between the adjacent array units in the x direction and the y direction respectively, and the calculation formulas are respectively as follows:

$$\Delta_{\phi_x} = k\Delta_x \sin\theta_\zeta,$$

$$\Delta_{\phi_y} = k\Delta_y \sin\theta_\xi;$$

wherein $\Delta_x$ and $\Delta_y$ are the distances between the array units in the x direction and the y direction respectively, the symbol sin denotes a sine function, $\theta_\zeta$ and $\theta_\xi$ are the coordinates of scanning angles in the x direction and the y direction when the center view angle direction points to the source coordinates ($\zeta$, $\xi$), and the calculation formulas are respectively as follows:

$$\theta_\zeta = -\tan^{-1}\left(\frac{\zeta}{U}\right),$$

$$\theta_\xi = -\tan^{-1}\left(\frac{\xi}{U}\right);$$

wherein U is an object distance, that is, a distance from a plane where the target is located to an array plane, and the symbol $\tan^{-1}$ denotes an arctangent function.

6. The method according to claim 3, wherein the step 3 comprises: performing focusing phase weighting on the array unit signals by a focusing phase weighting method to realize imaging focusing, wherein the focusing phase calculation formula of automatic focusing phase weighting is:

$$\phi_F = \frac{\eta k(x_m^2 + y_n^2)}{2R};$$

wherein R is a target slant distance, that is, a distance from the target to the array center;

the focusing phase calculation formula of variable-focus or fixed-focus phase weighting is:

$$\phi_F = \frac{\eta k(V-F)(x_m^2 + y_n^2)}{2VF};$$

wherein F is a focal distance, V is an image distance, that is, a distance from an imaging plane to a plane where a receiving plane is located, and F<U and F<V.

7. The method according to claim 3, wherein the step 4 comprises: performing fast imaging processing on the amplitude-phase-weighted array unit signals by the efficient parallel algorithm; and the efficient parallel algorithm comprises two-dimensional or three-dimensional FFT, IFFT, non-uniform FFT, sparse FFT, and the calculation formula is:

$$\vec{E}_q(\omega_\delta,\omega_\sigma) = \mathcal{F}(\vec{E} \cdot A \cdot e^{j\phi_F} \cdot e^{j\phi_S});$$

wherein the symbol $\mathcal{F}$ denotes an efficient parallel algorithm function, $\vec{E}$ is a target signal received by the array unit, A is an array unit amplitude weighting coefficient, $\phi_F$ is a focusing phase weighting coefficient, and $\phi_S$ is a scanning phase weighting coefficient;

the value ranges of $\omega_\delta$ and $\omega_\sigma$ corresponding to the image field calculation result are: $\omega_\delta \in [0,2\pi]$ and $\omega_\sigma \in [0,2\pi]$, the value ranges of $\omega_\delta$ and $\omega_\sigma$ after the fftshift operation are transformed into: $\omega_\delta \in [-\pi,\pi]$ and $\omega_\sigma \in [-\pi,\pi]$, and at this time, the image is an image according with the actual distribution:

$$\vec{E}_q(\omega_\delta,\omega_\sigma) = \text{fftshift}[\vec{E}_q(\omega_\delta,\omega_\sigma)].$$

8. The method according to claim 3, wherein the step 5 comprises: performing coordinate calculation on the image field obtained by the efficient parallel algorithm and performing coordinate inversion on the image field to obtain the distribution situation of a real target, wherein for the IFFT type efficient parallel algorithm, the formula of calculating the coordinates of the scanning angle of the image field is:

$$\theta_\delta = \sin^{-1}\left(\frac{\omega_\delta}{\eta k \Delta_x}\right),$$

$$\theta_\sigma = \sin^{-1}\left(\frac{\omega_\sigma}{\eta k \Delta_y}\right);$$

wherein the symbol $\sin^{-1}$ denotes an arcsine function;

for the FFT type efficient parallel algorithm, the formula of calculating the coordinates of the scanning angle of the image field is:

$$\theta_\delta = -\sin^{-1}\left(\frac{\omega_\delta}{\eta k \Delta_x}\right),$$

$$\theta_\sigma = -\sin^{-1}\left(\frac{\omega_\sigma}{\eta k \Delta_y}\right);$$

the rectangular coordinate calculation formula of the image is:

$$\delta = V\tan\theta_\delta;$$

$$\sigma = V\tan\theta_\sigma;$$

wherein the symbol tan denotes a tangent function;

the coordinate inversion calculation formula of the real target is:

$$\zeta = -\frac{U\delta}{V},$$

$$\xi = -\frac{U\sigma}{V}.$$

9. The method according to claim 3, wherein the distances $$\Delta_x \le \frac{\lambda}{2\eta} \text{ and } \Delta_y \le \frac{\lambda}{2\eta}$$

among units of a transceiving antenna are set, so that the imaging aliasing phenomenon is avoided.

10. Application of the method according to claim 1 in the fields of optical imaging, microwave imaging, radar detection, sonar, ultrasonic imaging, and target detection, imaging identification and wireless communication based on sound, light and electricity.

11. A fast imaging method suitable for passive imaging and active imaging, wherein the fast imaging method is applied to long-distance imaging and comprises:

selecting $U=\infty$, then $\phi_F=0$, wherein the simplified formula suitable for long-distance imaging is:

$\vec{E}_q(\omega_8,\omega_G)=\mathcal{F}(A\vec{E}e^{j\phi_S})$; and calculating the image by the efficient parallel algorithm as defined in claim 7, and obtaining the target distribution situation in a wide view range through one operation.

* * * * *